(12) United States Patent
Arnold et al.

(10) Patent No.: US 7,533,020 B2
(45) Date of Patent: *May 12, 2009

(54) METHOD AND APPARATUS FOR PERFORMING RELATIONAL SPEECH RECOGNITION

(75) Inventors: James F. Arnold, Helena, MT (US); Michael W. Frandsen, Helena, MT (US); Anand Venkataraman, Palo Alto, CA (US); Douglas A. Bercow, Menlo Park, CA (US); Gregory K. Myers, San Francisco, CA (US); David J. Israel, Palo Alto, CA (US); Venkata Ramana Rao Gadde, Santa Clara, CA (US); Horacio Franco, Menlo Park, CA (US); Harry Bratt, Mountain View, CA (US)

(73) Assignee: Nuance Communications, Inc., Burlington, MA (US)

( * ) Notice: Subject to any disclaimer, the term of this patent is extended or adjusted under 35 U.S.C. 154(b) by 774 days.

This patent is subject to a terminal disclaimer.

(21) Appl. No.: 11/063,357

(22) Filed: Feb. 23, 2005

(65) Prior Publication Data

US 2005/0234723 A1  Oct. 20, 2005

Related U.S. Application Data

(63) Continuation-in-part of application No. 09/967,228, filed on Sep. 28, 2001, now Pat. No. 6,996,519.

(51) Int. Cl.
G10L 15/18 (2006.01)

(52) U.S. Cl. ...................................... 704/257

(58) Field of Classification Search .................. 704/257
See application file for complete search history.

(56) References Cited

U.S. PATENT DOCUMENTS

| | | | |
|---|---|---|---|
| 5,177,685 A | 1/1993 | Davis et al. |
| 5,613,036 A | 3/1997 | Strong |
| 5,825,978 A | 10/1998 | Digalakis et al. |
| 5,839,106 A | 11/1998 | Bellegarda |
| 6,029,132 A | 2/2000 | Kuhn et al. |

(Continued)

OTHER PUBLICATIONS

Geutner, P., et al., "Transcribing Multilingual Broadcast News Using Hypothesis Driven Lexical Adaptation", Interactive Systems Laboratories, School of Computer Science, Carnegie Mellon University, In Proc. DARPA Broadcast News Workshop, http://www.nist.gov/speech/publications/darpa98/html/bn60/bn60.htm, 1998.

(Continued)

*Primary Examiner*—Susan McFadden
(74) *Attorney, Agent, or Firm*—Wolf, Greenfield & Sacks, P.C.

(57) ABSTRACT

A method and apparatus are provided for performing speech recognition using observable and meaningful relationships between words within a single utterance and using a structured data source as a source of constraints on the recognition process. Results from a first constrained speech recognition pass can be combined with information about the observable and meaningful word relationships to constrain or simplify subsequent recognition passes. This iterative process greatly reduces the search space required for each recognition pass, making the speech recognition process more efficient, faster and accurate.

23 Claims, 3 Drawing Sheets

U.S. PATENT DOCUMENTS

| | | |
|---|---|---|
| 6,314,165 B1 | 11/2001 | Junqua et al. |
| 6,526,380 B1 | 2/2003 | Thelen et al. |
| 6,631,346 B1 | 10/2003 | Karaorman et al. |
| 6,823,493 B2 | 11/2004 | Baker |
| 6,917,910 B2 | 7/2005 | Itoh et al. |
| 6,996,519 B2 * | 2/2006 | Franco et al. ............... 704/9 |
| 7,027,987 B1 | 4/2006 | Franz et al. |
| 7,308,404 B2 * | 12/2007 | Venkataraman et al. ..... 704/255 |

OTHER PUBLICATIONS

Hunt, M., "Automatic Identification of Spoken Names and Addresses—and why we should abolish account numbers," Novauris, A James Baker Company Presentation, www.novauris.com, Date Unknown, (Assignee became aware of this reference on Feb. 4, 2005).

* cited by examiner

METHOD AND APPARATUS FOR PERFORMING RELATIONAL SPEECH RECOGNITION

CROSS REFERENCE TO RELATED APPLICATIONS

This application is a continuation-in-part of U.S. patent application Ser. No. 09/967,228, filed Sep. 28, 2001 now U.S. Pat. No. 6,996,519, which is herein incorporated by reference in its entirety.

FIELD OF THE INVENTION

The invention relates generally to speech recognition and, more specifically, to speech recognition systems used to recognize groups of words that have observable and meaningful relationships.

BACKGROUND OF THE DISCLOSURE

Global Positioning System (GPS)-based navigation systems have recently become available in some automobiles. To use these systems, a driver must enter an address or location, typically with a touch screen. The navigation system then provides instructions (usually with a map, arrow displays, or a synthesized voice) that direct the driver from the present location to the desired location.

Although current navigation systems work quite well at providing directions, a driver cannot enter new locations via the touch screen while the car is moving. And even when the car is stopped, using a touch screen to enter an address can be slow and difficult.

Replacing or supplementing the touch screen with a speech recognition system would make navigation systems much easier to use, and would make it possible for a driver to enter an address while the car is moving. However, it is well known that recognition of spoken addresses is an extremely difficult task because of the huge number of street and city names that such a speech recognition system would need to recognize. See, for example, the discussion in U.S. Pat. No. 5,177,685 to Davis et al., at column 24, lines 45-56.

One way to reduce the "search space" of a speech recognizer is to use a "prompt and response" type interface. These systems typically prompt the speaker to say only one word or short phrase at a time. For example, the speaker may be prompted to say only a street number or only a city name. This allows the system to perform a series of much simpler speech recognition passes, rather than performing the very difficult task of recognizing an entire spoken address or other long or complex phrase.

Although prompt and response systems simplify the speech recognition task, they can be both slow and annoying to use because they require the speaker to answer a series of questions. Accordingly, there remains a need for speech recognition system that allows the speaker to say an address or other difficult to recognize phrase in a single utterance and have that utterance understood and acted upon.

SUMMARY OF THE INVENTION

The disadvantages associated with the prior art are overcome by a method and apparatus for performing speech recognition using the observable and meaningful relationships between words within a single utterance and using a structured data source as a source of constraints on the recognition process. Results from a first constrained speech recognition pass can be combined with information about the observable and meaningful word relationships to constrain or simplify subsequent recognition passes. This iterative process greatly reduces the search space required for each recognition pass, making the speech recognition process more efficient, faster and accurate.

DETAILED DESCRIPTION

Figure 1:
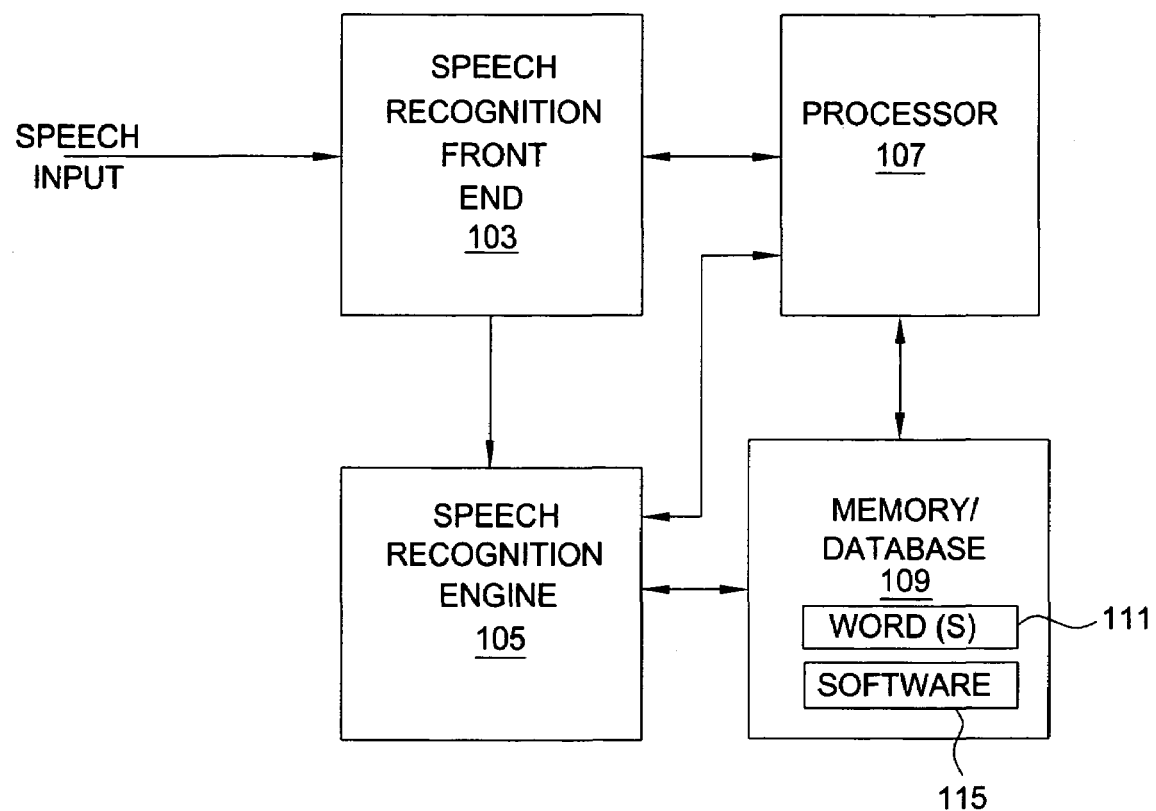
FIG. 1 is a block diagram of a speech recognition system that operates in accordance with the present invention.

FIG. 1 is a block diagram illustrating a speech recognition system 101 that operates in accordance with the present invention. This system 101 may be implemented in a portable device such as a hand held computer, a cellular phone, a personal digital assistant or an automobile. It may also be implemented in a stationary device such as a desktop personal computer or an appliance, or it may be distributed between both local and remote devices. The speech recognition system 101 illustratively comprises a speech recognition front end 103, a speech recognition engine 105, a processor 107, and a memory/database 109.

The speech recognition front end 103 receives and samples spoken input, and then measures and extracts features or characteristics of the spoken input that are used later in the speech recognition process. The speech recognition engine 105 may include a search algorithm (such as a Viterbi search algorithm) and acoustic models (such as models of individual phonemes or models of groups of phonemes) used in the speech recognition process. The processor 107 and associated memory 109 together operate as a computer to control the operation of the front end 103 and the speech recognition engine 105. The memory 109 stores recognizable words and word sets 111 in an accessible database that is used by the system 101 to process speech. Memory 109 also stores the software 115 that is used to implement the methods of the present invention. Both the speech recognition front end 103 and the speech recognition engine 105 may be implemented in hardware, software, or combination of hardware and software. All of the elements 103-109 may communicate with each other as required.

The invention relates to speech recognition systems and methods used to recognize words that have observable and meaningful relationships. Examples of word sets with observable and meaningful relationships are addresses; locations; names (e.g., of individuals, organizations or businesses), telephone numbers and types of goods or services offered (e.g., restaurants, hardware stores, etc.); airline flight numbers, departure/arrival times, and departure/arrival cities; product part numbers, catalog numbers, and product names; and any other sets of words used to identify a person, place or thing.

Groups of words with observable and meaningful relationships may be referred to as "sparse domains" or domains that have a small "Cartesian product" because typically only a small fraction of all possible word combinations are valid combinations. For example, an address with the ZIP code "94025" is only associated with the city of Menlo Park, Calif. "San Francisco, Calif. 94025" or "Menlo Park, N.J. 94025" are not valid addresses.

Figure 2:
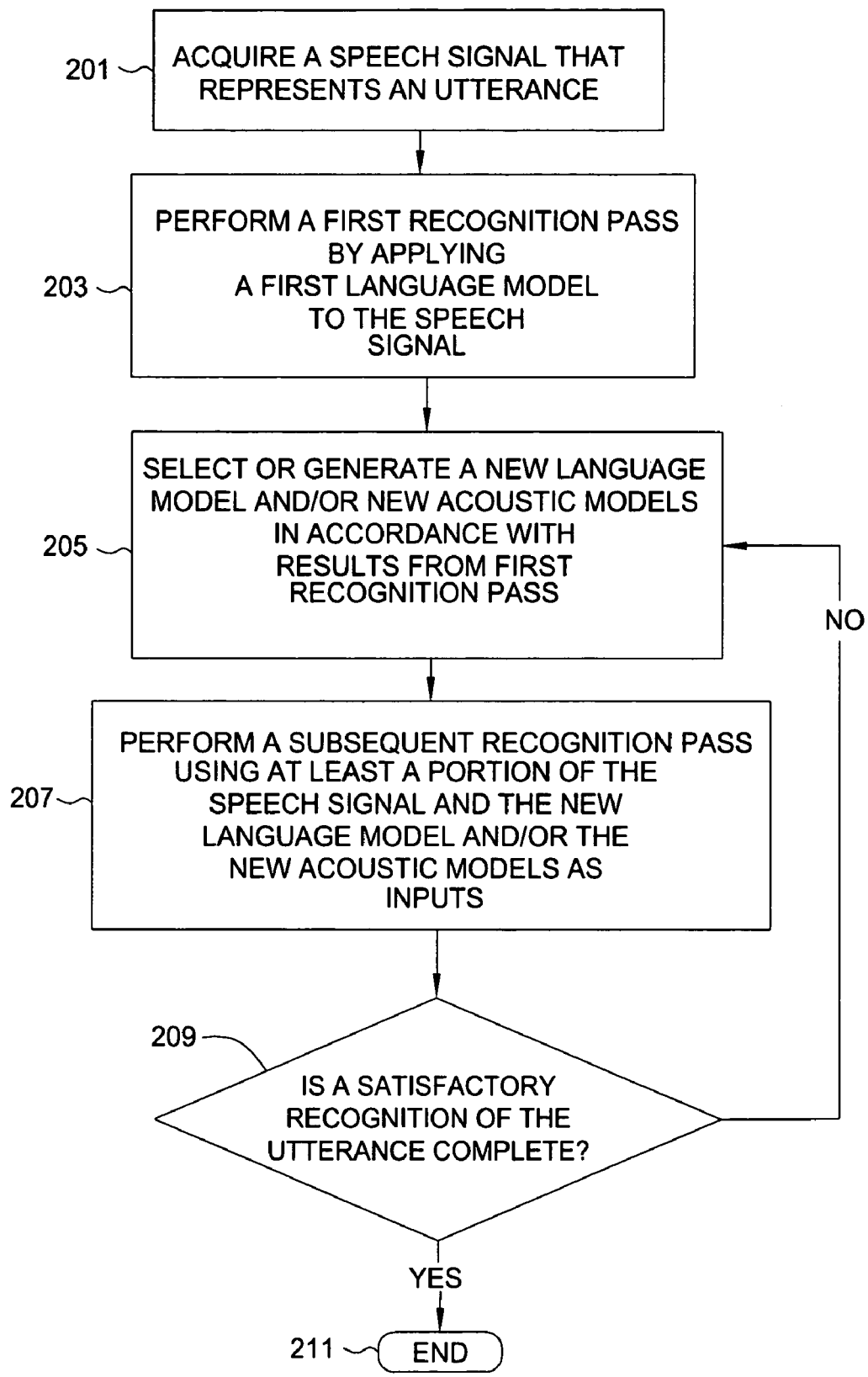
FIG. 2 is a flow chart illustrating a method for recognizing words that have observable and meaningful relationships.

FIG. 2 is a flow chart illustrating one embodiment of method for recognizing words that have observable and meaningful relationships. This method may be implemented as a software routine 115 that is executed by the processor 107 of FIG. 1. When a speech signal that represents a spoken utterance is received (step 201), a first speech recognition "pass" is performed by applying a first language model to the speech signal (step 203). The language model may be a probabilistic finite state grammar, a statistical language model, or any other language model that is useful in a speech recognition system. In one embodiment, the first language model is compiled at least partially based on information contained in structured data sources (e.g., a GPS position report, a telephone directory, the Internet and the like). The first recognition pass does not attempt to recognize the entire speech signal; for example, if the utterance represents an address (e.g., comprising a street number, street name, city name and optionally a state name), the first recognition pass may use a first language model that recognizes only city names or only street numbers.

Next, a new language model and/or new acoustic models are selected or generated (step 205). The selection or generation of the new model or models is based at least in part on results from the previous recognition pass (e.g., the first recognition pass performed in step 205), and may also be based on information regarding the linguistic structure of the domain and/or information regarding relationships among concepts, objects, or components in the domain. For example, the previous recognition passes may have recognized the city name "Menlo Park" and the street number "333." Based on this information, a new language model might be generated or selected that includes only those streets in Menlo Park that have "333" as a street number.

This new language model and/or acoustic models and at least a portion of the speech signal are then used to perform a subsequent recognition pass (step 207). If a satisfactory recognition of the spoken utterance is complete (step 209), the speech recognition process ends (step 211). If a satisfactory recognition of the spoken utterance is not complete, then steps 205-209 are repeated as necessary.

Figure 3:
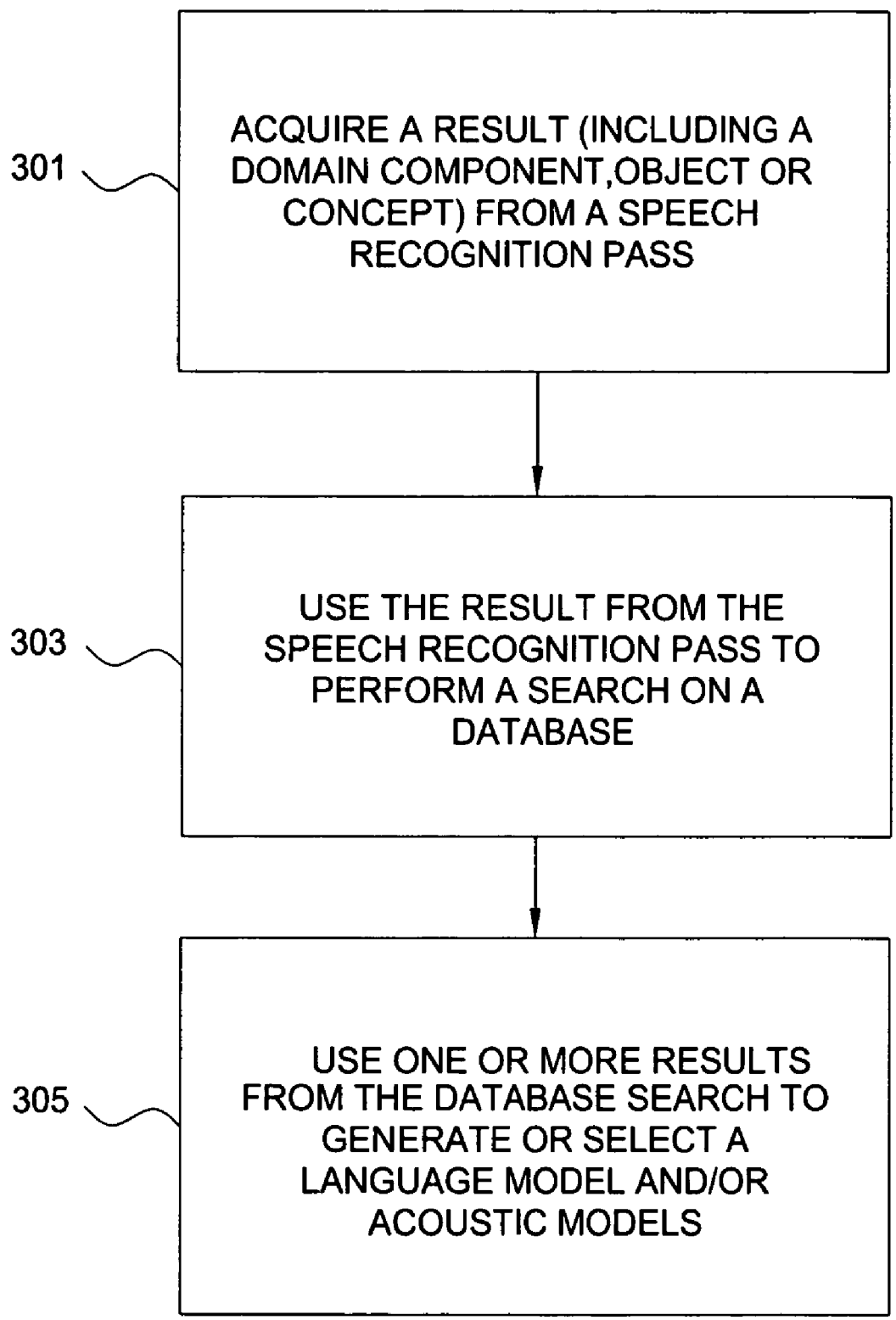
FIG. 3 is a flow chart illustrating a method for generating or selecting new language models and/or new acoustic models for use in a speech recognition process.

FIG. 3 is a flowchart that illustrates one embodiment of method for generating or selecting a new language model and/or new acoustic models (i.e., a method performing step 205 of FIG. 2.). In this method, a result from a speech recognition pass is acquired (step 301). This result includes a component, object or concept of the relevant domain. For example, as discussed above, if the speech recognition system is being used to recognize an address, the result from the previous recognition pass may include a street number and/or city name.

Next, the result from the speech recognition pass is used to perform a search on a database that contains information regarding relationships among the domain concepts, objects, or components) (step 303). For example, the database may be a relational database that has information regarding the relationships among the components of an address. A search on the city name "Menlo Park" might find all the street names in that city; a search on the ZIP code "94025" might find all the streets within that ZIP code; and so on.

Finally, one or more results from the database search are then used to select or generate a language model and/or acoustic models (step 305). For example, the results from a database search on the ZIP code "94025" might be used to generate a language model (or select an existing language model) that includes all of the street names in that ZIP code. Or, the results from a database search on the city name "Menlo Park" and the street name "Ravenswood Avenue" might be used to generate or select a language model that includes all of the street numbers on Ravenswood Avenue in Menlo Park. Language models generated or selected this way can be used to greatly reduce the search space of subsequent recognition passes, making the speech recognition process both faster and more accurate.

In one embodiment, the methods of FIGS. 2 and 3 could be tailored or constrained in accordance with a structured data source. That is, a structured data source could provide constraints for the first language model applied in the first recognition pass in step 203 of FIG. 2. For example, the first recognition pass could be constrained by geographic location (e.g., the user's current location or another geographic area of interest as specified by the user, or by a map or blueprint), by a telephone directory (e.g., including names, cities and/or types of goods and services offered by individuals, businesses and organizations), by the Internet, by user preferences (e.g., learned or user-programmed), by an address book (e.g., in a cellular telephone or personal digital assistant) and the like. By constraining the methods of FIGS. 2 and 3 in accordance with the structured data source, the method can not only reduce the amount of processing resources consumed in performing the recognition, but can also produce the recognition results more quickly.

In one embodiment, the first recognition pass is constrained to a limited geographic domain encompassing the location of the user at the time of operation. Thus, in one embodiment, the first language model applied in the first speech recognition pass (e.g., in step 203 of FIG. 2) is compiled for the user's current operating location. In this embodiment, the first language model could be triggered by a structured data source such as a GPS position report or other real-time identification of the current location of the user. This geographically tailored language model will aid in quickly narrowing the relevant search space.

For example, if the method knows the user's current geographic location, the method could constrain the first language model applied in the first recognition pass (e.g., in step 203 of FIG. 2) to include only street numbers and cities or city/state pairs located within a predefined geographic radius from the user's current location. Thus, the first language model could be defined as:

$$d+<\text{ignore}>\text{City[State]}$$

where d+ comprises strings of one or more digits and City [State] comprises cities or city/state pairs, the strings of digits representing street numbers that occur within the predefined geographic radius and the cities or city/state pairs representing cities and/or states that are located within the predefined geographic radius.

Based on recognition results obtained from applying this first, geographically limited language model (e.g., using an n-best recognizer), a new language model can be generated at run-time (e.g., by using the recognition results to search a database, in accordance with step 303 of FIG. 3) that includes only street numbers and cities recognized by the first recognition pass (that are within the predefined geographic radius from the user's current location) and street names. Thus, the new language model, using the d+ City[State] combinations produced by the first recognition pass of step 203 of FIG. 2, could be defined as:

$$D\text{ street-name City[State]}$$

where D comprises fixed strings of one or more digits (e.g., as recognized by the first recognition pass) and City[State] comprises cities or city/state pairs recognized by the first recognition pass.

Thus, if the user asks for directions to 333 Ravenswood Avenue in Menlo Park, and the user is currently located in Palo Alto, Calif. (with a predefined geographic radius limit of fifty miles), the first language model will not include, for example, Menlo Park, N.J. as a city or city/state pair, because Menlo Park, N.J. is more than fifty miles away from the user's current geographic location. The search space for the speech recognition method can therefore be rapidly narrowed based on geographic relevancy.

In one embodiment, the user's current geographic location is acquired (e.g., via a GPS position report) before the speech signal is acquired, so that the first language model based on the user's current geographic location is compiled and ready for application immediately upon receipt of a speech signal. In one embodiment, the first language model is created in this way periodically, based upon the travel of the user's vehicle (e.g., every x miles traveled). In another embodiment, the user's current geographic location is acquired after the acquisition of the speech signal (e.g., step 201) but before the first language pass is performed (e.g., step 203). In one embodiment, this first language model comprises leading digits (e.g., street numbers) and trailing city or city/state pairs.

As discussed above, the first language model could also be constrained in accordance with a variety of other structured data sources. For example, if the acquired speech signal is, "Find a Starbucks coffee shop in San Francisco", the Internet or a telephone directory including cities, names of businesses (e.g., stores or offices) and/or goods and services categories could serve as a source of constraints, where there may be a number of stores having the same or similar names, and other parts of the acquired speech signal (e.g., the city name or the type of goods and services) can disambiguate.

In another example, the first language model could be constrained to a location of future interest, e.g., where a map or blueprint is the source of constraints. This type of constraint may aid in recognizing, for example, a location to which the user is traveling, or a roadway or other waypoint along a user-requested route. For example, if the acquired speech signal is, "Take highway 280 from San Jose to San Bruno", a map (e.g., including roadways, highway mileage posts, exit numbers and names, etc.) could serve as the source of constraints, where only a limited number of highways can reasonably be taken between San Jose and San Bruno. In addition, blueprint information could provide a source of constraints for more local areas of interest (e.g., locations within buildings), where the acquired speech signal might be, for example, "Go from office EL258 up to office EL350" (and the command "up" is recognized to be consistent with office EL258 being on the second floor of a building and office EL350 being on the third floor of the building). This embodiment could be further applied to, for example, robotic gurneys and other automated forms of transport (e.g., where an acquired speech signal may be, for example, "Move the patient from room 508 to Intensive Care".)

In further embodiments, constraint sources such as maps and blueprints may aid in recognizing speech signals relating to areas of future interest based on one or more specified waypoints (e.g., hotels, restaurants, attractions and other locations of interest as specified by the user). In this embodiment, the method may constrain the first recognition pass to a union of the areas surrounding the plurality of identified waypoints.

In yet another embodiment, the method can constrain the first recognition pass based on user preferences (e.g., learned by use over time or programmed by the user). For example, if a user never asks the speech recognition device to locate a Walmart store, the method may "learn" not to include Walmart stores in the first language model (e.g., when the users asks the speech recognition device to locate, for example, "department stores in San Jose"). Alternatively, constraints based on preferences could be applied after a final recognition pass in order to remove individual results from a list of results.

While foregoing is directed to the preferred embodiment of the present invention, other and further embodiments of the invention may be devised without departing from the basic scope thereof, and the scope thereof is determined by the claims that follow.

What is claimed is:

1. A method for performing speech recognition, the method comprising:
   acquiring a speech signal from a user;
   performing a first recognition pass by applying a first language model to said speech signal, said first language model being constrained in accordance with a structured data source; and
   generating a subsequent language model based at least in part on results from said first recognition pass.

2. The method of claim 1, further comprising:
   performing a subsequent recognition pass by applying said subsequent language model; and
   recognizing said speech signal.

3. The method of claim 1, wherein said structured data source is at least one of a geographic location report, a map, a blueprint, a telephone directory, a service directory, the Internet, a mobile address book and one or more user preferences.

4. The method of claim 3, wherein said one or more user preferences are learned.

5. The method of claim 3, wherein said one or more user preferences are programmed by said user.

6. The method of claim 1, wherein said first language model is constrained to a limited geographic domain encompassing said user's current geographic location.

7. The method of claim 6, wherein said user's current geographic location is acquired prior to acquiring said speech signal.

8. The method of claim 7, wherein said user's current geographic location is acquired periodically based on said user's travel.

9. The method of claim 1, wherein said first language model is constrained to a geographic area specified by said user.

10. The method of claim 9, wherein said first language model is constrained to a union of geographic areas surrounding a plurality of waypoints identified by said user.

11. A computer readable storage medium containing an executable program for performing speech recognition, where the program performs the steps of:
   acquiring a speech signal from a user;
   performing a first recognition pass by applying a first language model to said speech signal, said first language model being constrained in accordance with a structured data source; and
   generating a subsequent language model based at least in part on results from said first recognition pass.

12. The computer readable storage medium of claim 11, further comprising:
- performing a subsequent recognition pass by applying said subsequent language model; and
- recognizing said speech signal.

13. The computer readable storage medium of claim 11, wherein said structured data source is at least one of a geographic location report, a map, a blueprint, a telephone directory, a service directory, the Internet, a mobile address book and one or more user preferences.

14. The computer readable storage medium of claim 13, wherein said one or more user preferences are learned.

15. The computer readable storage medium of claim 13, wherein said one or more user preferences are programmed by said user.

16. The computer readable storage medium of claim 11, wherein said first language model is constrained to a limited geographic domain encompassing said user's current geographic location.

17. The computer readable storage medium of claim 16, wherein said user's current geographic location is acquired prior to acquiring said speech signal.

18. The computer readable storage medium of claim 17, wherein said user's current geographic location is acquired periodically based on said user's travel.

19. The computer readable storage medium of claim 11, wherein said first language model is constrained to a geographic area specified by said user.

20. The computer readable storage medium of claim 19, wherein said first language model is constrained to a union of geographic areas surrounding a plurality of waypoints identified by said user.

21. Apparatus for performing speech recognition, said apparatus comprising:
- means for acquiring a speech signal from a user;
- means for performing a first recognition pass by applying a first language model to said speech signal, said first language model being constrained in accordance with a structured data source; and
- means for generating a subsequent language model based at least in part on results from said first recognition pass.

22. An apparatus for performing speech recognition, the apparatus comprising:
- at least one computer readable storage medium encoded with a plurality of instructions; and
- at least one processor programmed by at least some of the plurality of instructions to;
  - acquire a speech signal from a user;
  - perform a first recognition pass by applying a first language model to the speech signal, the first language model being constrained in accordance with a structured data source; and
  - generate a subsequent language model based at least in part on results from the first recognition pass.

23. The apparatus of claim 22, wherein the at least one processor is further programmed to:
- perform a subsequent recognition pass by applying the subsequent language model; and
- recognize the speech signal.

* * * * *